United States Patent [19]

Tomm

[11] Patent Number: 5,243,729
[45] Date of Patent: Sep. 14, 1993

[54] MOP FRAME HOLDER

[76] Inventor: Erwin Tomm, 3320 W. 130th St., Cleveland, Ohio 44111

[21] Appl. No.: 823,755

[22] Filed: Jan. 22, 1992

[51] Int. Cl.$^5$ ............................................. A47L 13/24
[52] U.S. Cl. ..................... 15/147.1; 15/145; 15/151; 15/176.1; 15/228; 403/316
[58] Field of Search ...................... 15/144.1, 145, 146, 15/147.1, 147.2, 151, 173, 176.1, 176.4, 176.5, 176.6, 228, 229.6; 403/315, 316, 317, 391, 396, 397, 100, 102

[56] References Cited

U.S. PATENT DOCUMENTS

| | | |
|---|---|---|
| 1,708,052 | 4/1929 | Channell . |
| 1,909,713 | 5/1933 | Parsons ............................. 15/147.1 |
| 2,050,762 | 8/1936 | Preisser et al. . |
| 2,134,301 | 10/1938 | Guggenbuehler . |
| 2,621,353 | 12/1952 | Bagley, Jr. . |
| 2,670,250 | 2/1954 | Greene. Jr. . |
| 2,975,004 | 3/1961 | Safianoff . |
| 3,029,454 | 4/1962 | Short et al. . |
| 3,227,496 | 1/1966 | Johnson ............................. 15/151 |
| 4,165,550 | 8/1979 | Burke . |
| 4,169,297 | 10/1979 | Welhrauch . |
| 4,237,573 | 12/1980 | Welhrauch . |
| 4,270,239 | 6/1981 | Gross ................................ 403/100 |
| 4,531,251 | 7/1985 | Pappas ............................. 15/147.1 |
| 4,765,014 | 8/1988 | Moss ................................ 15/147.1 |
| 4,783,873 | 11/1988 | Young . |

FOREIGN PATENT DOCUMENTS

| | | | |
|---|---|---|---|
| 1035344 | 4/1953 | France ................................ 15/145 |
| 1260226 | 3/1961 | France ................................ 15/145 |

Primary Examiner—Timothy F. Simone
Assistant Examiner—Randall E. Chin
Attorney, Agent, or Firm—Watts Hoffmann Fisher & Heinke

[57] ABSTRACT

The invention relates to a mop frame holder comprising a housing having a slot for receiving a portion of a mop frame, a cover plate slidably engagable with the housing for selectively covering the slot so as to lock the frame portion within the slot, a releasable device for locking the cover plate to the housing when the slot is covered and means for connecting a mop handle to the housing.

11 Claims, 6 Drawing Sheets

MOP FRAME HOLDER

FIELD OF THE INVENTION

This invention relates to a mop frame holder, and more particularly, to a dust mop frame holder which is selectively pivotable with respect to a mop handle.

BACKGROUND OF THE INVENTION

Dust mop frame holders are available in a wide variety of designs and materials. Many mop frame holders have drawbacks. Over time, some metal mop frame holders have a tendency to corrode. Corroded metal holders are dirty, difficult to manipulate and must eventually be thrown away. Moreover, many metal mop frame holders have sharp edges and protrusions that can snag or scratch furniture or injure the person using the device.

Many mop frame holders utilize numerous parts, such as springs, clips and fasteners which add to the cost and complexity of manufacturing the holders, and thus the price. Excessive numbers of parts also tend to make holders clumsy, bulky, heavy and difficult to manipulate. Additionally, when holders having even a few parts are made out of metal, the mop frame holder creates noise when in use due to the clanking together or grinding of the metal parts.

Some mop frame holders secure the mop frame within the holder with a spring loaded cover, often with an exposed release lever. Such devices can accidentally release the mop frame from the holder when bumped into or under furniture or forced into tight places. Still other mop frame holders employs screws for securing the mop frame into the holder. These holders are difficult to manipulate, requiring screwing and unscrewing to open and close the holder. Thus, changing mop frames can be difficult and time consuming. Moreover, if the screw is made of metal, it can corrode and become frozen making it virtually impossible to unscrew.

To overcome the problems associated with the prior art, it is an object of the invention to provide a mop frame holder that will not corrode, is made of only a small number of parts, will not accidentally open and release the mop frame, makes little noise when in use, provides excellent control of the mop frame, and is lightweight and easy to use. These and other advantages of the invention will become apparent to one of ordinary skill in the art from the following disclosure.

SUMMARY OF THE INVENTION

The invention comprises a mop frame holder including a housing for holding the mop frame. The housing has a slot for receiving a portion of a mop frame and a sliding cover plate for enclosing the frame portion in the housing. The cover plate is slidably disposed between opposite sides of the housing and releasably locked in a closed position when in use. The holder embodying the invention includes a body having a receptacle end for receiving a mop handle and a mounting end for mountably receiving the housing. The housing of the mop frame holder may be pivotably mounted on the body and preferably includes a device for selectively locking the housing with respect to the body so that it will not pivot on the body.

In a preferred embodiment the device for selectively fixing the housing includes a tongue extending from the housing, toward the receptacle end, for engaging a slidable locking member disposed on the body. When the locking member is slid to a forward position it engages the tongue thereby locking the housing in a fixed position. It is advantageous that the entire mop frame holder of the invention be made out of plastic.

In the preferred embodiment the housing includes front and side walls. The side walls have grooves for slidably receiving the cover plate and are higher than the cover plate so that the cover plate is slightly recessed below the upper surfaces of the walls, and the front wall has a device for lockingly engaging the cover plate. The slot for receiving the mop frame portion is formed by the front wall being in a spaced relation to the side walls. When the frame portion is placed in the slot and the cover plate is slid to a forward position in the grooves so as to lockingly engage the front wall, the rod is enclosed in the housing and thereby locked in place.

DETAILED DESCRIPTION OF THE INVENTION

In general, a mop frame holder of the invention comprises a housing having a slot for receiving a portion of a mop frame, a cover plate slidably engagable with the housing for selectively covering the slot to lock the frame portion within the slot, a releasable means for locking said cover plate to said housing when the slot is covered and means for connecting a mop handle to said housing.

Figure 9:
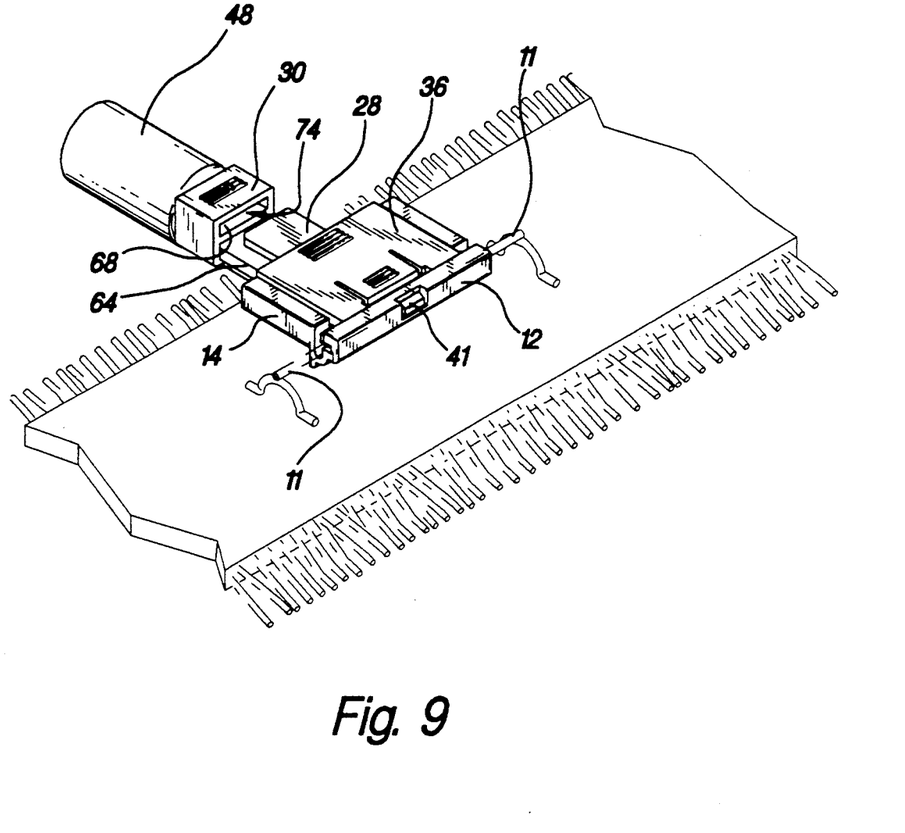
FIG. 9 is a perspective view of the mop frame holder assembly showing the relative placement of a mop frame and mop.

The preferred embodiment of the invention is seen in the drawings. For holding a portion of a mop frame, usually a thin rod portion shown at 11 in FIG. 9, the mop frame holder includes a housing 10, best seen in FIGS. 1 and 2. The housing is formed by front and side walls 12, 14 respectively, that extend integrally from a base 16 which interconnects them. The front wall 12 extends vertically from the upper surface 16a of the base 16 at its forward edge, and the two side walls 14 extend vertically from the upper surface of the base 16a at opposite side edges. The side edges of the housing are substantially perpendicular to the front edge. The side walls lie in a spaced relationship to the front wall so that a rod receiving slot 18 is formed by the space or gap between the front and side walls. A portion of the base 16 that spans the gap between the front and side walls dips below the plane of the remainder of the base 16 to form a groove 20. The groove 20 is an integral portion of the rod receiving slot 18 which extends the slot below the plane of the base surface and provides a seat for the rod of the mop frame.

Figure 1:
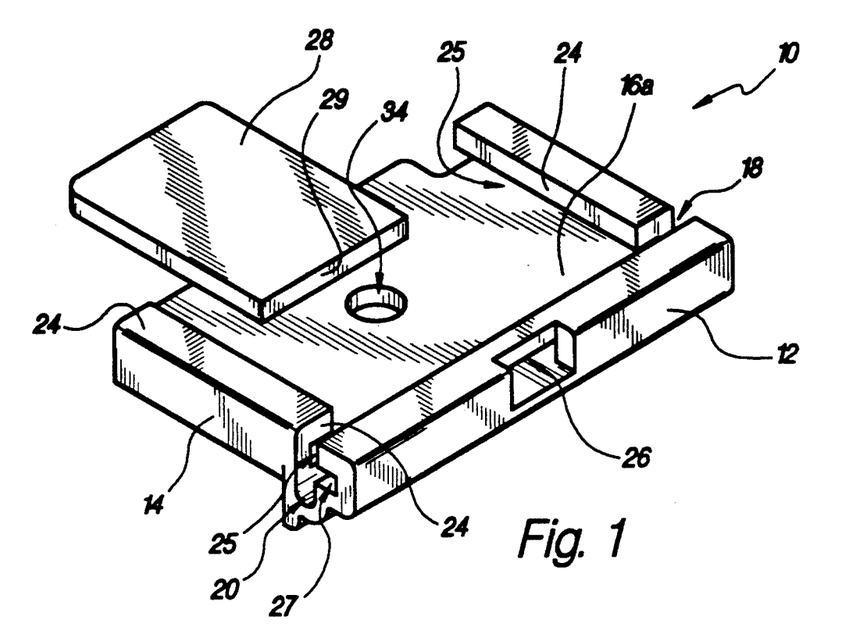
FIG. 1 is a perspective view of the mop frame holder housing of the invention.
Figure 2:
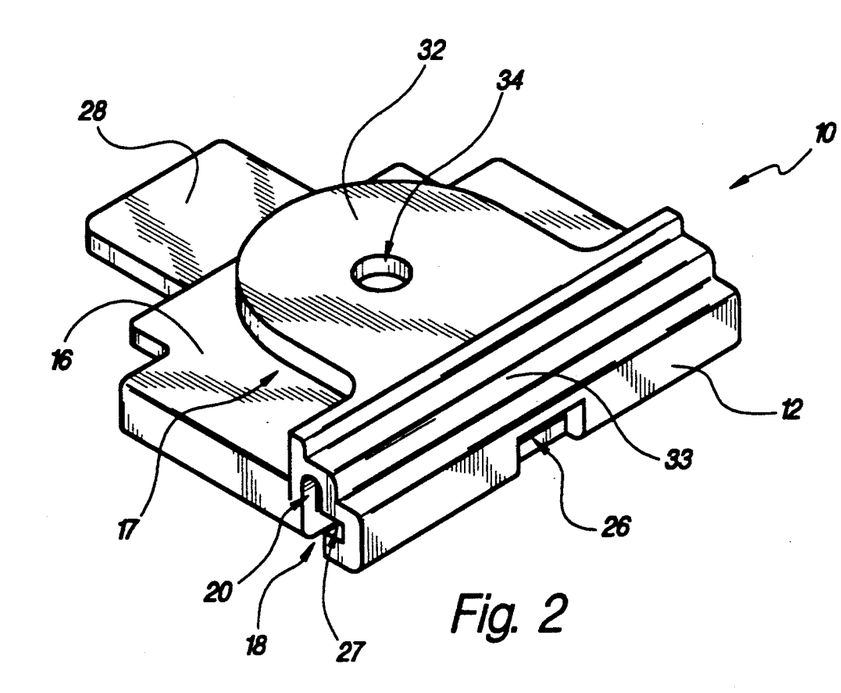
FIG. 2 is a perspective view of an opposite surface of the mop frame holder shown in FIG. 1.

The front and side walls 12, 14 respectively, extend a short distance vertically from the upper surface 16a of the base 16 and then turn inward and parallel to the base 16 for a short distance to form a lip 24. The space between the upper surface 16a of the base 16 and the lip portion 24 of the front and side walls forms inwardly facing grooves 25, 27 in the walls. The grooves 25 of the side walls 14 act as opposed guides for guiding the cover plate 36 and restricting its motion to a direction transverse to the slot 18. A hole 26 for releasably receiving a portion of the cover plate is disposed in the vertical portion of the front wall 12 near its center.

Extending rearwardly from the base 16 of the housing is a tongue 28 for engaging a locking member 30. The tongue 28 is a flat member formed on the upper surface of the base 16 substantially midway between the side walls 14. As shown, the tongue 28 is approximately the same thickness as the guide grooves 25 of the side walls.

A lower platform 32 extends rearwardly parallel to the base 16, and integrally from a forward chin portion 33 of the base that extends below the plane of the remainder of the base. The lower platform 32 is in a spaced relationship with the base 16 to form a gap 17 between the under surface of the base and the lower platform 32. A hole 34 for receiving a pivot pin 35 is disposed substantially in the center of the base 16 and lower platform 32.

Figure 3:
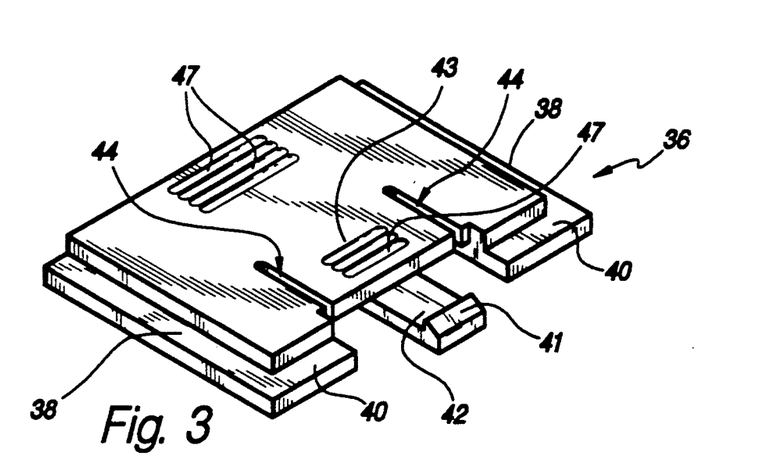
FIG. 3 is a perspective view of the cover plate for use in the mop frame holder of the invention.
Figure 4:
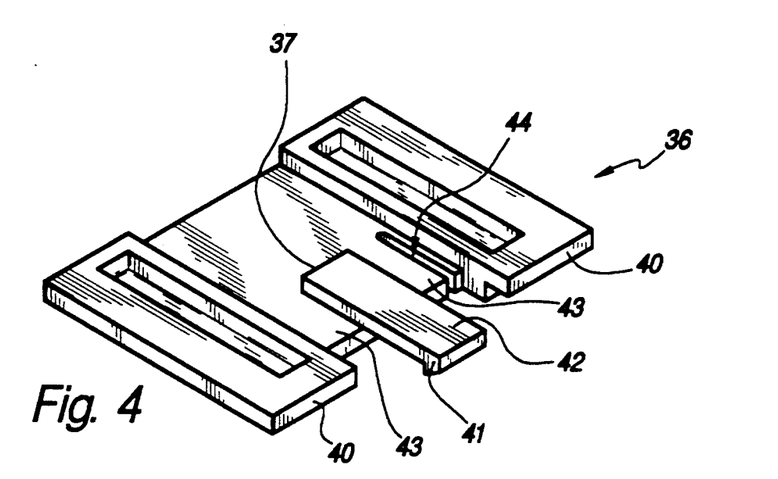
FIG. 4 is a perspective view of an opposite surface of the cover plate shown in FIG. 3.

The cover plate 36 serves to releasably lock the rod portion of the mop frame within the rod receiving slot 18 of the housing 10. The cover plate 36 is a substantially planer plate having thinner side flanges 38 that are slidably received by the guide grooves 25 of the side walls of the housing 10. The flanges continue along a portion of the forward edge of the cover plate to form a forward flange 40 that is received into the forward groove 27 of the front wall 12.

A hook member 42 is disposed at about the center of the forward edge of the cover plate. When the cover is slid forward into the housing the hook member cooperates with the hole 26 in the front wall to releasably engage the front wall. The hook member 42 extends integrally from a portion of the cover plate defined by two slots 44 formed longitudinally in the cover plate to render the hook member depressible in a downward direction. To release the hook 41 from its engagement with the front wall 12, pressure is applied to the depressible portion 43 of the cover plate having the hook member 42 extending therefrom. This releases the hooks' engagement from the hole 26 in the front wall. The upper surface of the cover plate includes grooves 47 for improving ones grip thereon.

A central portion of the underside of the cover plate 36 is dimensioned to permit it to freely slide over the tongue 28 so that the plate 36 can be selectively moved longitudinally to a forward or rearward position. In the rearward position, edge 37 communicates with edge 29 of the tongue to act as a rearward stop. When the side flanges 38 of the cover plate are slidably received into the guide grooves 25, the upper surface of the cover plate is slightly lower than the upper surfaces of the parallel lip portions 24 of the walls. An advantage of this configuration is that accidental bumping or contact of the housing with furniture and the like will not release the mop frame from the housing. For example, when mopping under a desk or other piece of furniture having low ground or floor clearance, the housing can be run into the lower edge of the furniture or even forced thereunder and the pressure on the top of the housing will not cause the mop frame to be unintentionally released. Moreover, the housing is compact and does not have sharp edges and protrusions to snag, scratch or get caught in furniture, clothing and the like.

Figure 7:
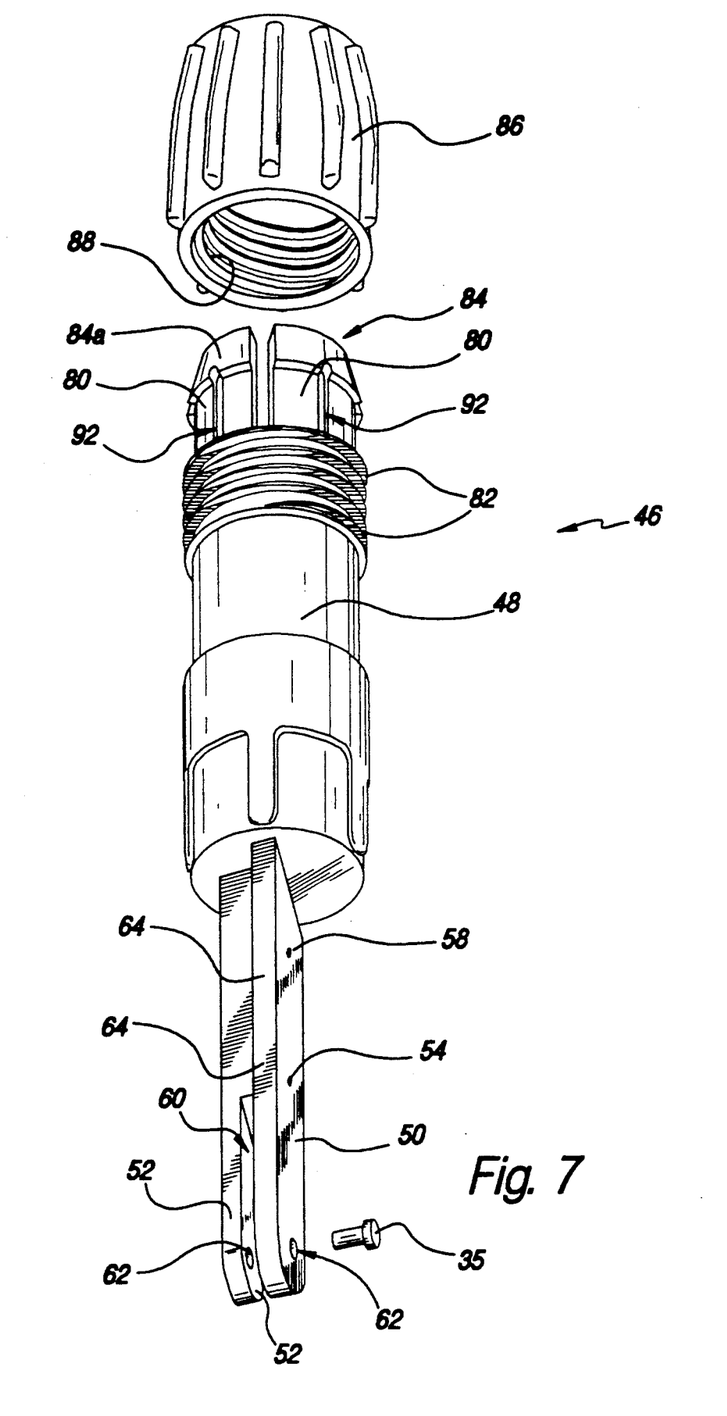
FIG. 7 is a perspective view of a body upon which the mop frame holder is pivotably mounted.
Figure 8:
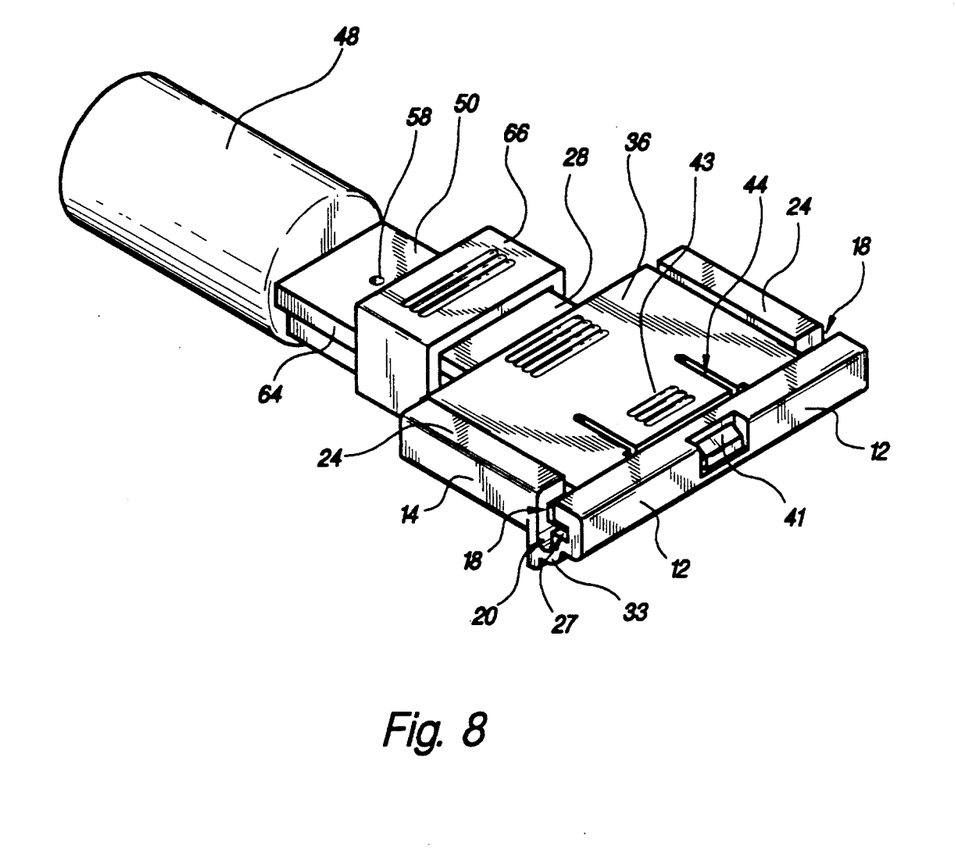
FIG. 8 is a perspective view of the mop frame holder assembly of the invention.

The mop frame holding assembly of the invention includes a body 46 that has a receptacle or socket 48 for receiving a handle at its rearward end. The handle (not shown) can be secured into the socket by conventional fastening means known to those skilled in the art. The forward portion or mounting end of the body is adapted so that the housing 10 may be pivotably mounted thereon. To this end, the forward portion of the body has an upper platform 50 and a lower support platform 52. The upper platform 50 has a substantially flat upper surface that extends laterally from the center of the body and includes forward and rearward detents 54, 58. The upper platform 50 and the lower platform 52 are disposed in a spaced relationship to form a void 60 for receiving the lower platform 32 of the housing 10 therebetween. A pivot pin hole 62 for receiving the pivot pin 35 is disposed through the two platforms. When the lower platform 32 of the housing is disposed in the void 60 between the upper and lower platforms of the body 50, 52 respectively, and the holes in the housing and body respectively, are aligned, the pivot pin 35 may be inserted and secured so that the housing 10 is pivotally mounted on the body 46.

As shown, the upper platform 50 of the body 46 is wider in the lateral direction than the lower platform 52. Lateral side flanges 64 are disposed along the body, from the upper platform 50 to the socket 48. The side flanges 64 are formed from the integral extension of the wider portion of the upper platform 50 rearwardly along the body.

Figure 5:
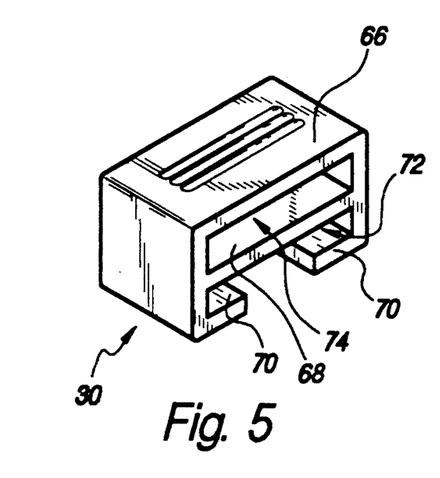
FIG. 5 is a perspective view of a locking member for use with the mop frame holder of the invention.
Figure 6:
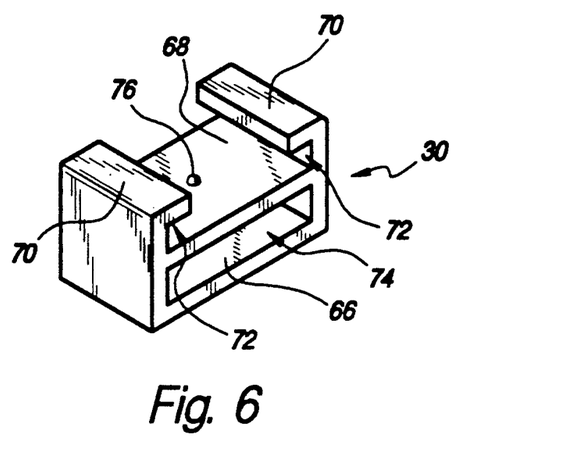
FIG. 6 is a perspective view of an opposite surface of the locking member shown in FIG. 5.

Also disposed on the body 46 is a locking member 30 which can move longitudinally along the body. The locking member has opposing L-shaped sides connected together by upper and lower bridge portions 66, 68 respectively. The bridge portions are substantially parallel to each other and disposed one above the other in a spaced relationship. The space between the lower of the two bridge pieces 68 and the inwardly turned lip portion 70 of the L-shaped sides forms grooves 72 for slidably receiving the flanges 64 formed by the extension of the upper platform 50 rearwardly along the body 46. The space between the two bridge portions forms a void 74 for receiving the rearward tongue 28 of the base 16 of the housing 10. When the locking member is moved into the forward position, the rearward tongue 28 is received into the void 74 of the locking member. The locking member when mounted on the body moves longitudinally along the body 46 to selectively engage and disengage the tongue 28 of the housing 10.

To releasably secure the locking member 30 in either the forward or rearward position, a small knob 76 is disposed on the bottom surface of the lower bridge portion 68 of the locking member. The knob is located so that it communicates with the forward and rearward detents 54, 58 in the surface of the platform 50 to frictionally engage the locking member with the shaft when in either of the forward or rearward positions. When the locking member 30 is in a forward position the tongue 28 is engaged and the housing 10 cannot pivot with respect to the body 46. When the locking member is in a rearward position the housing 10 can freely pivot about the axis of the pivot pin 34.

Figure 10:
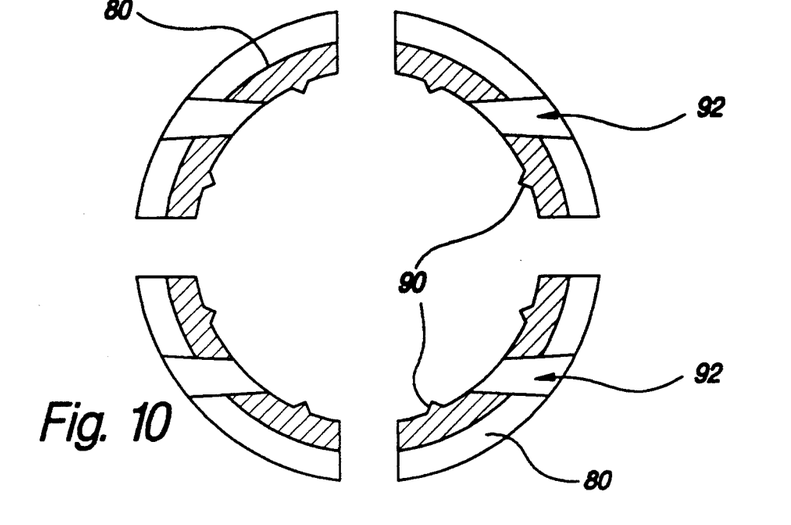
FIG. 10 is a plan view down a handle receiving end of a body according to the invention.
Figure 11:
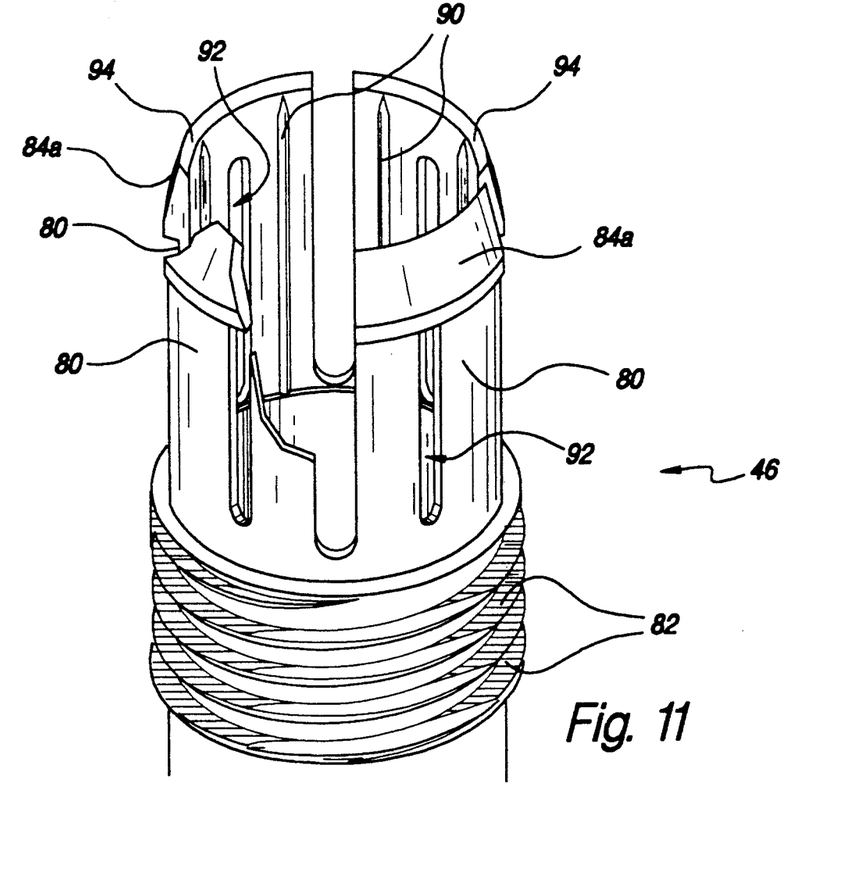
FIG. 11 is a perspective view of the handle receiving end in FIG. 10.

The mop frame holder may be secured to a threaded mop handle by providing the receptacle end with interior threads, preferably Acme ¾ inch diameter, five threads per inch. Alternatively, the receptacle end may form a split collet for receiving threaded or unthreaded handles having varying diameters. The advantage of the split collet type receptacle end is that it locks a screwed in handle in position, keeping it from unscrewing due to the torques and twists of usage, to make a solid unit between the handle and mop frame holder. Such a collet, best seen in FIGS. 7, 10 and 11, is typically a cylindrical handle receiving socket split longitudinally into sections 80 and having exterior threads 82 and a cone shaped handle receiving end 84. An outer sleeve 86, seen in FIG. 7, having interior threads 88 which cooperate with the exterior threads 82 on the cylindrical handle receiving socket moves longitudinally along the handle receiving socket. The outer sleeve 86 has an interior shaped to correspond and cooperate with the cone 84a at the handle receiving end of the handle receiving socket. When the outer sleeve is screwed longitudinally on the handle receiving socket it slides down along the cone 84a of the handle receiving socket to force the sections 80 of the split collet inward against a handle disposed in the cylindrical socket.

As seen in FIG. 10, such a collet may have raised ribs 90 on the interior surface of the collet sections 80 to increase the bite against the handle, and longitudinal slots 92 in the collet sections to improve the ease with which the sections conform to the round handle. Preferably, the leading edge 94 of each section 80 is bevelled to from a bell mouth opening to increase the ease with which a handle may be inserted. While the nature of the handle receiving receptacle end is not critical, the collet type with a bell mouth opening is preferred since it advantageously makes insertion of a handle easier, especially when replacing an old handle when the split collet tends to close up to a smaller diameter. In any case, it is preferable that the mop frame holder be adaptable to varying handle types used in the janitorial industry.

It is advantageous to make the mop frame holder of the invention entirely out of molded plastic. Plastic is durable and does not corrode. Moreover, plastic parts are quiet and tend to cause less damage when bumped into objects, such as wood furniture, since there are no sharp edges. In a preferred embodiment the plastic used is polypropylene which can optionally contain a co-polymer to render it less brittle when cold. Fillers known to those skilled in the art such as mica, talc and the like may be optionally added to the plastic. While the plastic noted above is the preferred material of the invention, being very economical, it would be well within the skill in the art to select other suitable plastics.

While the forgoing is a detailed description of the preferred embodiment of the instant invention, modifications and equivalents would be known to one of ordinary skill in the art. It is intended that this disclosure be construed to include such modifications and equivalents that are within the scope and spirit of this invention and the appended claims.

What is claimed is:

1. A mop frame holder comprising:
    a) a housing and a detachable cover plate adapted to be mounted on said housing, said housing including a slot for receiving a portion of a mop frame and a front wall portion including receiving means for releasably receiving a portion of said cover plate;
    b) said cover plate slidably engageable with said housing for selectively covering said slot for locking said mop frame portion within said slot, said cover plate including releasable means for engaging into said receiving means of said front wall portion thereby locking said cover plate to said housing when said slot is covered;
    c) means for connecting a mop handle to said housing.

2. A mop frame holder according to claim 1, wherein said housing comprises a pair of opposed guides for guiding said cover plate and restricting its movement to a direction transverse to the direction of said slot, said guides having upper surfaces that are raised above said cover plate.

3. A mop frame holder according to claim 1, wherein said connecting means comprises a body having a receptacle end for receiving a handle, and pivot means pivotally joining said housing to said body, whereby said housing with said cover plate engaged into said receiving means can pivot on said body.

4. A mop frame holder according to claim 3, wherein said body includes a locking device for selectively locking said body with respect to said housing.

5. A mop frame holder according to claim 4, wherein said locking device comprises a sliding member fitted to said body to slide longitudinally thereon, and said housing includes a tongue extending therefrom, wherein said sliding member is selectively engagable with said tongue extending from said housing to lock said body and said housing together to prevent relative motion therebetween.

6. A mop frame holder according to claim 1, wherein said holder is formed entirely of molded plastic.

7. A mop frame holder comprising:
    a housing and a body for receiving a handle, said housing adapted to be pivotably mounted on said body for receiving a handle, said housing including front and side walls, said side walls having grooves for slidably receiving a cover plate, a cover plate for said housing and said front wall having means for receiving and lockingly engaging a portion of said cover plate, said front wall being in a spaced relation to said side walls to form a slot for receiving a rod from a mop frame, whereby when said rod is disposed in said slot and said cover plate is slid in a forward position in said grooves, at least a portion of the cover plate lockingly engages into said receiving means of said front wall thereby enclosing said rod in said housing, and wherein said housing can pivot on said body with said rod enclosed therein.

8. A mop holder according to claim 7, wherein said body further comprises a longitudinally slidable locking member and said rod holding housing further comprises a rearward tongue which is engagable with said longitudinally slidable locking member, said locking member being slidably mounted on said body, whereby when said locking member is slid into a forward position, said member engages said tongue such that said housing cannot pivot on said body.

9. A mop holder according to claim 8, wherein said holder is formed entirely of molded plastic.

10. A mop frame holder comprising:
a) a housing for holding a rod portion of a mop frame, said housing comprising a substantially planar base having an upper surface, front and side walls extending vertically from said substantially planar base, a forward portion, said side walls being normal to and spaced from said front wall thereby forming a slot between the front and side walls; said front and side walls having inwardly turned lip portions disposed substantially parallel to the base to form grooves, said lip portions having upper surfaces, said front wall further including a hole disposed therein for receiving a portion of a cover plate, said housing further including a rod nesting groove formed by the portion of said base traversing the space which forms the slot between said side walls and said front wall which dips below the plane of the remainder of the base;
b) a body comprising a receptacle end for receiving a mop handle and a mounting end for pivotably receiving said housing, said mounting end including a lower platform and an upper platform disposed parallel to and in spaced relationship with said lower platform, said upper platform being wider in the lateral direction than said lower platform, integrally forming lateral side flanges along said body by the integral extension of said wider portion of the upper platform rearwardly toward said receptacle end along said body;
c) a locking member slidably engaged to said body comprising upper and lower bridge portions and opposing L-shaped sides connected by said upper and lower bridge portions, said bridge portions being substantially parallel and in a spaced relationship to each other, and said lower bridge portion including a bottom surface and a knob on said bottom surface thereof;
d) a substantially flat tongue for engaging said locking member, said tongue extending from said housing opposite said front wall, and being disposed on said upper surface of said base substantially midway between said side walls;
e) a housing lower platform extending rearwardly from said forward portion of said housing, said housing lower platform being parallel and in a spaced relationship with said base;
f) a cover plate having an upper surface that is slightly below the upper surfaces of said lip portions of said front and side walls, side flanges for being slidably received by said grooves in said side walls, whereby said cover plate is longitudinally slidable between said side walls; said cover plate further comprising a forward edge and a hook member disposed at said forward edge thereof, said hook member being releasably engagable with said hole in said front wall;
g) whereby when said rod is disposed in said slot and said cover plate is slid in a forward position in said grooves, the cover plate lockingly engages said front wall thereby enclosing said rod in said housing.

11. A mop frame holder according to claim 10, wherein said receptacle end is a split collet.

* * * * *